(12) United States Patent
Kuroda

(10) Patent No.: US 10,021,316 B2
(45) Date of Patent: Jul. 10, 2018

(54) PHOTOELECTRIC CONVERSION DEVICE HAVING A PLURALITY OF PHOTOELECTRIC CONVERSION UNITS AND A PLURALITY OF CHARGE HOLDING UNITS, AND IMAGING SYSTEM

(71) Applicant: CANON KABUSHIKI KAISHA, Tokyo (JP)

(72) Inventor: Yukihiro Kuroda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 14/972,817

(22) Filed: Dec. 17, 2015

(65) Prior Publication Data

US 2016/0212366 A1 Jul. 21, 2016

(30) Foreign Application Priority Data

Jan. 21, 2015 (JP) ................................. 2015-009241

(51) Int. Cl.
| | |
|---|---|
| *H04N 5/235* | (2006.01) |
| *H04N 5/232* | (2006.01) |
| *H04N 5/355* | (2011.01) |
| *H04N 5/3745* | (2011.01) |
| *H04N 5/225* | (2006.01) |

(52) U.S. Cl.
CPC ......... *H04N 5/2355* (2013.01); *H04N 5/2258* (2013.01); *H04N 5/23212* (2013.01); *H04N 5/3559* (2013.01); *H04N 5/37452* (2013.01)

(58) Field of Classification Search
CPC .......................... H04N 5/2258; H04N 5/2355
See application file for complete search history.

(56) References Cited

U.S. PATENT DOCUMENTS

| | | | |
|---|---|---|---|
| 7,526,192 B2 * | 4/2009 | Nakahara | G03B 13/36 348/349 |
| 7,709,869 B2 | 5/2010 | Kuroda | |
| 7,911,521 B2 | 3/2011 | Kuroda et al. | |
| 7,935,995 B2 | 5/2011 | Watanabe et al. | |

(Continued)

FOREIGN PATENT DOCUMENTS

| | | |
|---|---|---|
| JP | 2006-041866 | 2/2006 |
| JP | 2012-049904 | 3/2012 |
| JP | 2011-530920 | 12/2012 |

*Primary Examiner* — Cynthia Segura
(74) *Attorney, Agent, or Firm* — Fitzpatrick, Cella, Harper & Scinto

(57) ABSTRACT

A photoelectric conversion device includes a unit pixel cell including a first photoelectric conversion unit and a second photoelectric conversion unit, a first charge holding unit, a second charge holding unit, and a third charge holding unit, a first transfer unit provided between the first photoelectric conversion unit and the first charge holding unit, a second transfer unit provided between the first photoelectric conversion unit and the third charge holding unit, a third transfer unit provided between the second photoelectric conversion unit and the second charge holding unit, and a fourth transfer unit provided between the second photoelectric conversion unit and the third charge holding unit, wherein the number of all photoelectric conversion units connected to the first to third charge holding units is smaller than three as the total number of the first to third charge holding units.

18 Claims, 7 Drawing Sheets

(56) References Cited

U.S. PATENT DOCUMENTS

| | | | |
|---|---|---|---|
| 8,174,599 B2 | 5/2012 | Kuroda et al. | |
| 8,223,238 B2 | 7/2012 | Kuroda et al. | |
| 8,264,673 B2 * | 9/2012 | Mase | G01S 7/4863 |
| | | | 257/460 |
| 8,305,449 B2 * | 11/2012 | Sato | G02B 7/38 |
| | | | 348/145 |
| 8,345,137 B2 | 1/2013 | Shinohara et al. | |
| 8,520,104 B2 * | 8/2013 | Fossum | H01L 27/14609 |
| | | | 257/222 |
| 8,670,058 B2 | 3/2014 | Hayashi et al. | |
| 8,698,930 B2 | 4/2014 | Kinugasa et al. | |
| 8,704,926 B2 | 4/2014 | Schemmann et al. | |
| 8,710,558 B2 | 4/2014 | Inoue et al. | |
| 9,001,245 B2 * | 4/2015 | Wang | H01L 27/14603 |
| | | | 348/297 |
| 9,236,406 B2 | 1/2016 | Kuroda | |
| 2008/0100738 A1 * | 5/2008 | Tsuchiya | G03B 13/18 |
| | | | 348/345 |
| 2008/0212955 A1 * | 9/2008 | Kikuchi | H04N 5/23212 |
| | | | 396/121 |
| 2010/0097508 A1 * | 4/2010 | Yanagita | H01L 27/14603 |
| | | | 348/301 |
| 2011/0090385 A1 * | 4/2011 | Aoyama | H01L 27/14603 |
| | | | 348/308 |
| 2011/0096217 A1 * | 4/2011 | Sano | H01L 27/14603 |
| | | | 348/300 |
| 2012/0002089 A1 * | 1/2012 | Wang | H01L 27/14603 |
| | | | 348/297 |
| 2012/0175503 A1 | 7/2012 | Kuroda et al. | |
| 2013/0021510 A1 * | 1/2013 | Sambonsugi | H04N 5/355 |
| | | | 348/302 |
| 2014/0022354 A1 * | 1/2014 | Okigawa | H04N 5/347 |
| | | | 348/46 |
| 2014/0210954 A1 * | 7/2014 | Takahashi | H01L 27/14621 |
| | | | 348/49 |
| 2014/0253767 A1 | 9/2014 | Kato et al. | |
| 2015/0042857 A1 | 2/2015 | Kususaki et al. | |
| 2016/0197117 A1 * | 7/2016 | Nakata | H04N 5/35554 |
| | | | 257/225 |
| 2016/0219238 A1 * | 7/2016 | Tsuboi | H04N 5/37457 |
| 2017/0352697 A1 * | 12/2017 | Onuki | H01L 27/14609 |
| 2017/0353675 A1 * | 12/2017 | Onuki | H04N 5/35581 |

* cited by examiner

PHOTOELECTRIC CONVERSION DEVICE HAVING A PLURALITY OF PHOTOELECTRIC CONVERSION UNITS AND A PLURALITY OF CHARGE HOLDING UNITS, AND IMAGING SYSTEM

BACKGROUND OF THE INVENTION

Field of the Invention

The present invention relates to a photoelectric conversion device and an imaging system.

Description of the Related Art

In general, a photoelectric conversion device is required to have a high sensitivity and a wide signal output range (dynamic range) with respect to the amount of incident light.

Japanese Patent Application Laid-Open No. 2006-041866 discloses a photoelectric conversion device in which a photoelectric conversion unit and a pair of transfer elements are provided in each of a plurality of unit pixels arranged in an imaging area, and a charge holding unit is shared between two unit pixels adjacent in a vertical direction. Then, a signal charge accumulated for a long period of time is read from one photoelectric conversion unit of the two unit pixels and a signal charge accumulated for a short period of time is read from the other into the charge holding unit at the same time to expand the signal output range with respect to the amount of incident light.

Japanese Patent Application Laid-Open No. 2012-049904 discloses a photoelectric conversion device having unit pixels in each of which a charge holding unit and a reset unit are shared between a pair of photoelectric conversion units. According to the photoelectric conversion devices disclosed in Japanese Patent Application Laid-Open No. 2006-041866 and Japanese Patent Application Laid-Open No. 2012-049904, signal charges accumulated in two photoelectric conversion units are read into one charge holding unit so that the signal amplitude with respect to the amount of incident light can be enlarged.

In the techniques of Japanese Patent Application Laid-Open No. 2006-041866 and Japanese Patent Application Laid-Open No. 2012-049904, signal charges are read into the same charge holding unit in both a case where a signal charge is read from only one photoelectric conversion unit and a case where signal charges are read from a plurality of photoelectric conversion units. Therefore, the charge holding unit has limitations placed on the design thereof to be responsive to both the case of reading a signal charge from only one photoelectric conversion unit and the case of reading signal charges from the plurality of photoelectric conversion units. For example, when the capacitance value of the charge holding unit is set large to be responsive to reading from the plurality of photoelectric conversion units, the sensitivity is deficient when a signal is read from only one photoelectric conversion unit. On the other hand, if the capacitance value of the charge holding unit is set small to obtain high sensitivity when reading a signal from only one photoelectric conversion unit, it will increase the probability of being saturated even with a small amount of light in reading from the plurality of photoelectric conversion units.

SUMMARY OF THE INVENTION

An object of the present invention is to provide a photoelectric conversion device capable of easily realizing both the improvement of sensitivity and the expansion of a signal output range with respect to the amount of incident light. It is another object of the present invention to provide an image system capable of acquiring a higher-resolution image.

According to one aspect of the present invention, there is provided a photoelectric conversion device including a unit pixel cell having a plurality of photoelectric conversion units and a plurality of charge holding units, wherein the unit pixel cell includes a first photoelectric conversion unit and a second photoelectric conversion unit, each of which is part of the plurality of photoelectric conversion units, a first charge holding unit, a second charge holding unit, and a third charge holding unit, each of which is part of the plurality of charge holding units, a first transfer unit provided in an electric path between the first photoelectric conversion unit and the first charge holding unit, a second transfer unit provided in an electric path between the first photoelectric conversion unit and the third charge holding unit, a third transfer unit provided in an electric path between the second photoelectric conversion unit and the second charge holding unit, and a fourth transfer unit provided in an electric path between the second photoelectric conversion unit and the third charge holding unit, a number of all photoelectric conversion units connected to the first charge holding unit, the second charge holding unit, and the third charge holding unit is smaller than three as a total number of the first charge holding unit, the second charge holding unit, and the third charge holding unit.

According to another aspect of the present invention, there is provided a photoelectric conversion device including a unit pixel cell including a first photoelectric conversion unit, a first transfer unit and a second transfer unit connected to the first photoelectric conversion unit, a first charge holding unit connected to the first transfer unit and to which a signal charge generated in the first photoelectric conversion unit is transferred, a second photoelectric conversion unit, a third transfer unit and a fourth transfer unit connected to the second photoelectric conversion unit, a second charge holding unit connected to the third transfer unit and to which a signal charge generated in the second photoelectric conversion unit is transferred, and a third charge holding unit connected to the second transfer unit and the fourth transfer unit, and to which a signal charge generated in the first photoelectric conversion unit and a signal charge generated in the second photoelectric conversion unit are transferred, wherein a first capacitance value of the first charge holding unit and a second capacitance value of the second charge holding unit are smaller than a third capacitance value of the third charge holding unit.

According to still another aspect of the present invention, there is provided an imaging system including a photoelectric conversion device including a unit pixel cell having a plurality of photoelectric conversion units and a plurality of charge holding units, wherein the unit pixel cell includes a first photoelectric conversion unit and a second photoelectric conversion unit, each of which is part of the plurality of photoelectric conversion units, a first charge holding unit, a second charge holding unit, and a third charge holding unit, each of which is part of the plurality of charge holding units, a first transfer unit provided in an electric path between the first photoelectric conversion unit and the first charge holding unit, a second transfer unit provided in an electric path between the first photoelectric conversion unit and the third charge holding unit, a third transfer unit provided in an electric path between the second photoelectric conversion unit and the second charge holding unit, and a fourth transfer unit provided in an electric path between the second photoelectric conversion unit and the third charge holding unit, a number of all photoelectric conversion units connected to the first charge holding unit, the second charge holding unit, and the third charge holding unit is smaller than three as a total number of the first charge holding unit, the second charge holding unit and the third charge holding unit, a first sensor unit and a second sensor unit provided by arranging the plurality of unit pixel cells in a two-dimensional array along a first direction and a second direction that intersects with the first direction, the first photoelectric conversion unit and the second photoelectric conversion unit are arranged along the first direction in each of the unit pixel cells, and the first sensor unit and the second sensor unit are arranged along the second direction, an optical system for forming an image from a subject in the first sensor unit and the second sensor unit of the photoelectric conversion device, respectively, an operation unit for calculating distance to the subject based on a signal output from the first sensor unit and a signal output from the second sensor unit, and a control unit for controlling the optical system to focus on an imaging face based on the distance to the subject calculated by the calculation unit.

According to yet another aspect of the present invention, there is provided an imaging system including a photoelectric conversion device including a unit pixel cell including a first photoelectric conversion unit, a first transfer unit and a second transfer unit connected to the first photoelectric conversion unit, a first charge holding unit connected to the first transfer unit and to which a signal charge generated in the first photoelectric conversion unit is transferred, a second photoelectric conversion unit, a third transfer unit and a fourth transfer unit connected to the second photoelectric conversion unit, a second charge holding unit connected to the third transfer unit and to which a signal charge generated in the second photoelectric conversion unit is transferred, and a third charge holding unit connected to the second transfer unit and the fourth transfer unit, and to which a signal charge generated in the first photoelectric conversion unit and a signal charge generated in the second photoelectric conversion unit are transferred, wherein first capacitance of the first charge holding unit and second capacitance of the second charge holding unit are smaller than third capacitance of the third charge holding unit, an optical system for forming an image from a subject in the first sensor unit and the second sensor unit of the photoelectric conversion device, respectively, an operation unit for calculating distance to the subject based on a signal output from the first sensor unit and a signal output from the second sensor unit, and a control unit for controlling the optical system to focus on an imaging face based on the distance to the subject calculated by the calculation unit.

Further features of the present invention will become apparent from the following description of exemplary embodiments with reference to the attached drawings.

DESCRIPTION OF THE EMBODIMENTS

Photoelectric conversion devices and imaging systems according to embodiments of the present invention will be described below with reference to the accompanying drawings.

First Embodiment

A photoelectric conversion device and a method of driving the same according to a first embodiment of the present invention will be described with reference to FIG. 1 and FIG. 2.

Figure 1:
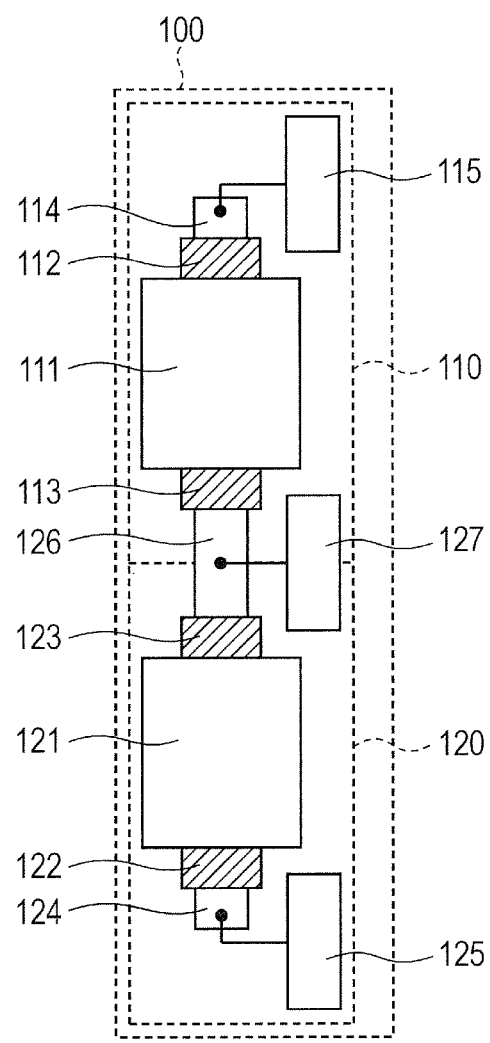
FIG. 1 is a schematic view illustrating a unit pixel cell of a photoelectric conversion device according to a first embodiment of the present invention.

FIG. 1 is a schematic view of a unit pixel cell that constitutes part of a photoelectric conversion device according to the present embodiment. FIG. 2 is an equivalent circuit diagram illustrating a specific configuration example of the unit pixel cell of the photoelectric conversion device according to the present embodiment.

First, the configuration of the photoelectric conversion device according to the present embodiment will be described with reference to FIG. 1 and FIG. 2.

The photoelectric conversion device according to the present embodiment includes a unit pixel cell 100 illustrated in FIG. 1. As illustrated in FIG. 1, the unit pixel cell 100 includes a first pixel 110 and a second pixel 120. The first pixel 110 has a first photoelectric conversion unit 111, a first transfer unit 112, a second transfer unit 113, a first charge holding unit 114, and a first signal output unit 115. A second pixel 120 has a second photoelectric conversion unit 121, a third transfer unit 122, a fourth transfer unit 123, a second charge holding unit 124, and a second signal output unit 125. The unit pixel cell 100 further includes a third charge holding unit 126 and a third signal output unit 127 shared between the first pixel 110 and the second pixel 120.

The first photoelectric conversion unit 111 has a rectangular shape with the first transfer unit 112 and the second transfer unit 113 arranged on the opposite short sides, respectively. The first photoelectric conversion unit 111 is connected to the first charge holding unit 114 through the first transfer unit 112 and the third charge holding unit 126 through the second transfer unit 113, respectively. The first charge holding unit 114 is connected to the first signal output unit 115. In other words, the first transfer unit 112 is provided in an electric path between the first photoelectric conversion unit 111 and the first charge holding unit 114. Further, the second transfer unit 113 is provided in an electric path between the first photoelectric conversion unit 111 and the third charge holding unit 126.

Similarly, the second photoelectric conversion unit 121 has a rectangular shape with the third transfer unit 122 and the fourth transfer unit 123 arranged on the opposite short sides, respectively. The second photoelectric conversion unit 121 is connected to the second charge holding unit 124 through the third transfer unit 122 and the third charge holding unit 126 through the fourth transfer unit 123, respectively. The second charge holding unit 124 is connected to the second signal output unit 125. In other words, the third transfer unit 122 is provided in an electric path between the second photoelectric conversion unit 121 and the second charge holding unit 124. Further, the fourth transfer unit 123 is provided in an electric path between the second photoelectric conversion unit 121 and the third charge holding unit 126.

The total number of photoelectric conversion units connected to the first charge holding unit 114, the second charge holding unit 124, and the third charge holding unit 126 is two, i.e., the first photoelectric conversion unit 111 and the second photoelectric conversion unit 121, which is smaller than three as the total number of charge holding units (the first charge holding unit 114, the second charge holding unit 124, and the third charge holding unit 126).

The second transfer unit 113 and the fourth transfer unit 123 are arranged to face each other across the third charge holding unit 126. The third charge holding unit 126 is connected to the third signal output unit 127.

The first photoelectric conversion unit 111 and the second photoelectric conversion unit 121 are configured to generate and accumulate signal charges according to the amount of incident light. The first transfer unit 112 is configured to transfer, by a predetermined operation, a signal charge accumulated in the first photoelectric conversion unit 111 to the first charge holding unit 114. The first signal output unit 115 is configured to output an electric signal (pixel signal) according to the amount of signal charge held in the first charge holding unit 114. Similarly, the third transfer unit 122 is configured to transfer, by a predetermined operation, a signal charge accumulated in the second photoelectric conversion unit 121 to the second charge holding unit 124. The second signal output unit 125 is configured to output an electric signal (pixel signal) according to the amount of signal charge held in the second charge holding unit 124.

Further, the second transfer unit 113 is configured to transfer, by a predetermined operation, a signal charge accumulated in the first photoelectric conversion unit 111 to the third charge holding unit 126. Similarly, the fourth transfer unit 123 is configured to transfer, by a predetermined operation, a signal charge accumulated in the second photoelectric conversion unit 121 to the third charge holding unit 126. Then, the third signal output unit 127 is configured to output an electric signal (pixel signal) according to the amount of signal charge held in the third charge holding unit 126.

Figure 2:
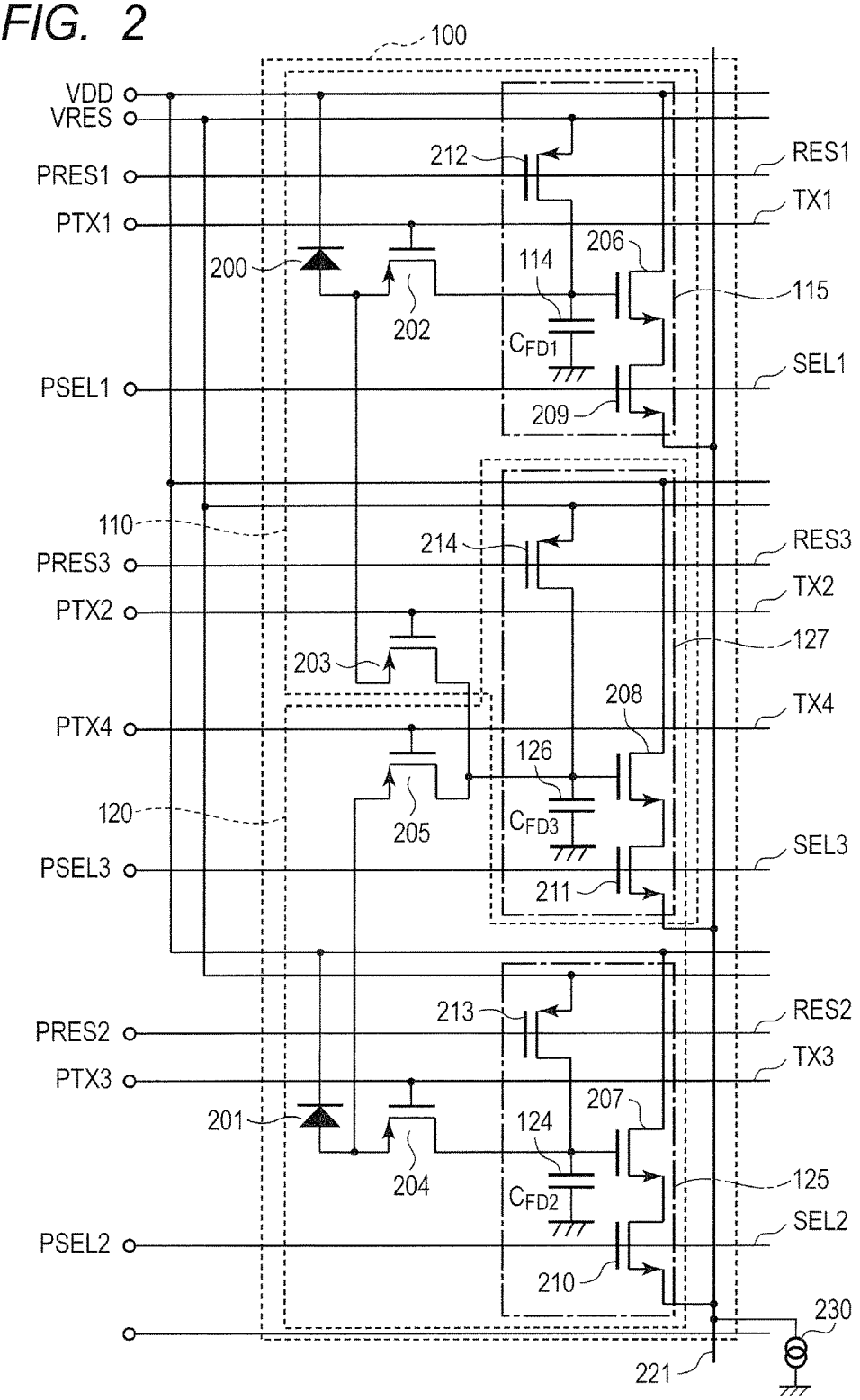
FIG. 2 is an equivalent circuit diagram illustrating a specific configuration example of the unit pixel cell of the photoelectric conversion device according to the first embodiment of the present invention.

FIG. 2 is an equivalent circuit diagram illustrating a specific configuration example of the unit pixel cell 100 illustrated in FIG. 1.

In FIG. 2, a photodiode 200 corresponds to the first photoelectric conversion unit 111. The cathode of the photodiode 200 is connected to a power-supply voltage line VDD. The anode of the photodiode 200 is connected to the source of a transfer transistor 202 that constitutes the first transfer unit 112 and to the source of a transfer transistor 203 that constitutes the second transfer unit 113. An amplifier transistor 206, a select transistor 209, and a reset transistor 212 constitute the first signal output unit 115. The drain of the transfer transistor 202 is connected to the gate of the amplifier transistor 206 and the drain of the reset transistor 212. The drain of the amplifier transistor 206 is connected to the power-supply voltage line VDD. The source of the amplifier transistor 206 is connected to the drain of the select transistor 209. The source of the reset transistor 212 is connected to a reset voltage line VRES. A connection node among the drain of the transfer transistor 202, the gate of the amplifier transistor 206, and the drain of the reset transistor 212 constitutes the first charge holding unit 114. In FIG. 2, the first charge holding unit 114 is represented as capacitor $C_{FD1}$ formed between the connection node and a ground voltage line. The capacitor $C_{FD1}$ is the capacitance component of the first charge holding unit 114 as seen from the first signal output unit 115.

Similarly, a photodiode 201 corresponds to the second photoelectric conversion unit 121. The cathode of the photodiode 201 is connected to the power-supply voltage line VDD. The anode of the photodiode 201 is connected to the source of a transfer transistor 204 that constitutes the third transfer unit 122 and the source of a transfer transistor 205 that constitutes the fourth transfer unit 123. An amplifier transistor 207, a select transistor 210, and a reset transistor 213 constitute the second signal output unit 125. The drain of the transfer transistor 204 is connected to the gate of the amplifier transistor 207 and the drain of the reset transistor 213. The drain of the amplifier transistor 207 is connected to the power-supply voltage line VDD. The source of the amplifier transistor 207 is connected to the drain of the select transistor 210. The source of the reset transistor 213 is connected to the reset voltage line VRES. A connection node among the drain of the transfer transistor 204, the gate of the amplifier transistor 207, and the drain of the reset transistor 213 constitute the second charge holding unit 124. In FIG. 2, the second charge holding unit 124 is represented as capacitor $C_{FD2}$ formed between the connection node and the ground voltage line. The capacitor $C_{FD2}$ is the capacitance component of the second charge holding unit 124 as seen from the second signal output unit 125.

An amplifier transistor 208, a select transistor 211, and a reset transistor 214 constitute the third signal output unit 127. The drains of the transfer transistors 203 and 205 are connected to the gate of the amplifier transistor 208 and the drain of the reset transistor 214. The drain of the amplifier transistor 208 is connected to the power-supply voltage line VDD. The source of the amplifier transistor 208 is connected to the drain of the select transistor 211. The source of the reset transistor 214 is connected to the reset voltage line VRES. A connection node among the drains of the transfer transistors 203 and 205, the gate of the amplifier transistor 208, and the drain of the reset transistor 214 constitutes the third charge holding unit 126. In FIG. 2, the third charge holding unit 126 is represented as capacitor $C_{FD3}$ formed between the connection node and the ground voltage line. The capacitor $C_{FD3}$ is the capacitance component of the third charge holding unit 126 as seen from the third signal output unit 127. Here, the capacitance value of the capacitor $C_{FD1}$ of the first charge holding unit 114 and the capacitance value of the capacitor $C_{FD2}$ of the second charge holding unit 124 are set smaller than the capacitance value of the capacitor $C_{FD3}$ of the third charge holding unit 126, respectively.

The gates of the transfer transistors 202, 203, 204, and 205 are connected to control lines TX1, TX2, TX3, and TX4, respectively. Thus, corresponding transfer transistors 202, 203, 204, and 205 can be driven by control signals PTX1, PTX2, PTX3, and PTX4 applied to the control lines TX1, TX2, TX3, and TX4.

The gates of the select transistors 209, 210, and 211 are connected to control lines SEL1, SEL2, and SEL3, respectively. Thus, corresponding select transistors 209, 210, and 211 can be driven by control signals PSEL1, PSEL2, and PSEL3 applied to the control lines SEL1, SEL2, and SEL3.

The gates of the reset transistors 212, 213, and 214 are connected to control lines RES1, RES2, and RES3, respectively. Thus, corresponding reset transistors 212, 213, and 214 can be driven by control signals PRES1, PRES2, and PRES3 applied to the control lines RES1, RES2, and RES3.

The sources of the select transistors 209, 210, and 211 are connected to a signal output line 221. A constant current circuit 230 is connected to the signal output line 221.

Note that FIG. 1 schematically illustrates a connection relationship between respective units. Further, FIG. 2 illustrates an example of a circuit that constitutes each unit. The arrangement and configuration of each unit are not limited to those illustrated in FIG. 1 and FIG. 2. For example, the first charge holding unit 114, the second charge holding unit 124, and the third charge holding unit 126 can have a configuration formed as an impurity diffused region and electrically connected to the gates of the amplifier transistors 206, 207, and 208 through metal interconnections. Further, although the third charge holding unit 126 is illustrated as one region, it does not always have to be one region, and divided regions may be electrically connected through interconnections.

Further, the designation of the source and the drain of each transistor may be different depending on the conductivity type of the transistor or the function to be focused, and all or some of the sources and drains mentioned above may be referred to as those opposite to each other.

Next, the operation of the photoelectric conversion device according to the present embodiment will be described with reference to FIG. 1 and FIG. 2.

When a Low-level control signal PRES1 is output from an unillustrated control unit to the control line RES1, the reset transistor 212 is turned on, and the first charge holding unit 114 is connected to the reset voltage line VRES through the reset transistor 212. Thus, the first charge holding unit 114 is reset to a reset level potential. In this case, if a Low-level control signal PTX1 is output from the control unit to the control line TX1 to turn on the transfer transistor 202, the photodiode 200 can also be reset to the reset level potential.

When light is incident on the photodiode 200 as the first photoelectric conversion unit 111, a signal charge according to the amount of incident light is generated by photoelectric conversion at the photodiode 200. The generated signal charge is accumulated in the photodiode 200. Similarly, when light is incident on the photodiode 201 as the second photoelectric conversion unit 121, a signal charge according to the amount of incident light is generated by photoelectric conversion at the photodiode 201. The generated signal charge is accumulated in the photodiode 201.

When the Low-level control signal PTX1 is output from the control unit to the control line TX1, the transfer transistor 202 is turned on, and the signal charge (hole in the example of the present embodiment) accumulated in the photodiode 200 is transferred to the first charge holding unit 114. Thus, the voltage across the first charge holding unit 114 becomes a voltage according to the capacitance value of the capacitor $C_{FD1}$ and the amount of transferred signal charge, and this voltage is applied to the gate of the amplifier transistor 206.

In this state, when a High-level control signal PSEL1 is output from the control unit to the control line SEL1, the select transistor 209 is turned on, and the source of the amplifier transistor 206 is connected to the signal output line 221 through the select transistor 209. Thus, the amplifier transistor 206 gets into a state where bias current is supplied to the source thereof from the constant current circuit 230 through the select transistor 209 and the signal output line 221 to constitute a source follower circuit. Then, a pixel signal according to the amount of signal charge transferred to the first charge holding unit 114 is output to the signal output line 221 through the select transistor 209.

Further, when a Low-level control signal PTX3 is output from the control unit to the control line TX3, the transfer transistor 204 is turned on, and the signal charge accumulated in the photodiode 201 is transferred to the second charge holding unit 124. Thus, the voltage across the second charge holding unit 124 becomes a voltage according to the capacitance value of the capacitor $C_{FD2}$ and the amount of transferred signal charge, and this voltage is applied to the gate of the amplifier transistor 207.

In this state, when a High-level control signal PSEL2 is output from the control unit to the control line SEL2, the select transistor 210 is turned on, and the source of the amplifier transistor 207 is connected to the signal output line 221 through the select transistor 210. Thus, the amplifier transistor 207 gets into a state where bias current is supplied to the source thereof from the constant current circuit 230 through the select transistor 210 and the signal output line 221 to constitute a source follower circuit. Then, a pixel signal according to the amount of signal charge transferred to the second charge holding unit 124 is output to the signal output line 221 through the select transistor 210.

Alternatively, when Low-level control signals PTX2, PTX4 are output from the control unit to the control lines TX2, TX4, the transfer transistors 203, 205 are turned on, and the signal charges accumulated in the photodiodes 200, 201 are transferred to the third charge holding unit 126. Thus, the voltage across the third charge holding unit 126 becomes a voltage according to the capacitance value of the capacitor $C_{FD3}$ and the amount of transferred signal charges, and this voltage is applied to the gate of the amplifier transistor 208.

In this state, when a High-level control signal PSEL3 is output from the control unit to the control line SEL3, the select transistor 211 is turned on, and the source of the amplifier transistor 208 is connected to the signal output line 221 through the select transistor 211. Thus, the amplifier transistor 208 gets into a state where bias current is supplied to the source thereof from the constant current circuit 230 through the select transistor 211 and the signal output line 221 to constitute a source follower circuit. Then, a pixel signal according to the amount of signal charge transferred to the third charge holding unit 126 is output to the signal output line 221 through the select transistor 211.

Here, in the photoelectric conversion device according to the present embodiment, the first charge holding unit 114, the second charge holding unit 124, and the third charge holding unit 126 are so configured that the capacitance value of the capacitor $C_{FD1}$ and the capacitance value of the capacitor $C_{FD2}$ will be smaller than the capacitance value of the capacitor $C_{FD3}$ as mentioned above. Therefore, when the signal charge accumulated in the photodiode 200 is output from the first signal output unit 115, the conversion efficiency becomes high compared with the case of being output from the third signal output unit 127, enabling imaging with higher sensitivity. The same applies to a case where the signal charge accumulated in the photodiode 201 is output from the second signal output unit 125.

When a charge holding unit is shared between a plurality of pixels like the third charge holding unit 126, there is a limit to making the capacitance parasitic to this charge holding unit small due to the number and layout of elements to be connected. In this regard, in the photoelectric conversion device according to the present embodiment, two transfer units are provided for a photoelectric conversion unit and connected thereto, respectively, to provide a charge holding unit independent for each pixel and a charge holding unit shared between two pixels. Since the capacitance value of the charge holding unit independent for each pixel can be easily made smaller than the capacitance value of the charge holding unit shared between a plurality of pixels, the capacitance value of the charge holding unit can be easily made smaller than that in the case of a configuration having only a charge holding unit shared between the plurality of pixels. This enables imaging with higher sensitivity, and hence the performance of the photoelectric conversion device under a low light environment can be improved.

On the other hand, when the signal charge accumulated in the photodiode 200 is output from the third signal output unit 127, since the capacitance value of the capacitor $C_{FD3}$ is larger than the capacitance value of the capacitor $C_{FD1}$, the pixel signal output range with respect to the amount of incident light can be expanded compared with the case of being output from the first signal output unit 115. This can improve the performance of the photoelectric conversion device under a high light environment. The same applies to a case where the signal charge accumulated in the photodiode 201 is output from the third signal output unit 127. Further, a pixel signal obtained by totaling the signal charge accumulated in the photodiode 200 and the signal charge accumulated in the photodiode 201 can also be output from the third signal output unit 127, and this can lead to speeding up and making the photoelectric conversion device highly functional.

Thus, in the present embodiment, two transfer units are provided for a photoelectric conversion unit and connected thereto, respectively, to provide a charge holding unit independent for each pixel and a charge holding unit shared between two pixels. This can make the capacitance value of the independent charge holding unit smaller than the capacitance value of the charge holding unit shared between two pixels, and hence both the improvement of sensitivity and the expansion of the signal output range can be achieved.

Second Embodiment

A photoelectric conversion device according to a second embodiment of the present invention will be described with reference to FIG. 3. The same reference numerals are given to the same constituent elements as those in the photoelectric conversion device according to the first embodiment illustrated in FIG. 1 and FIG. 2 to omit or simplify the description.

Figure 3:
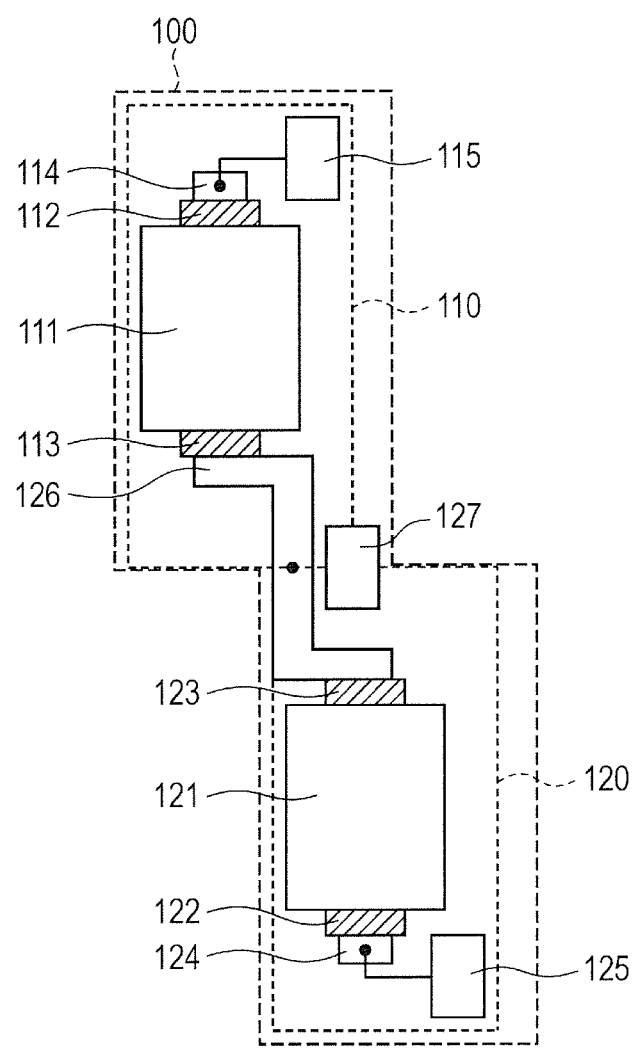
FIG. 3 is a schematic view illustrating a unit pixel cell of a photoelectric conversion device according to a second embodiment of the present invention.

FIG. 3 is a schematic view of a unit pixel cell of the photoelectric conversion device according to the present embodiment.

As illustrated in FIG. 3, the photoelectric conversion device according to the present embodiment is different from the photoelectric conversion device according to the first embodiment illustrated in FIG. 1 in terms of the layout of the first pixel 110 and the second pixel 120.

In the photoelectric conversion device according to the first embodiment, the first pixel 110 and the second pixel 120 are arranged adjacent to each other in the first direction, and at the same position in the second direction that intersects with the first direction. Here, the first direction is the longitudinal direction in FIG. 1, i.e., the vertical direction or the column direction as an example. Further, the second direction is the traverse direction in FIG. 1, i.e., the horizontal direction or the row direction as an example. The first direction and the second direction are at right angles to each other in the typical example.

In contrast, in the photoelectric conversion device according to the present embodiment, the first pixel 110 and the second pixel 120 are arranged adjacent to each other in the first direction, but out of alignment with each other by a half pitch in the second direction from the adjacent positions in the first direction. The arrangement of the first pixel 110 and the second pixel 120 to be out of alignment with each other by a half pitch in the second direction means the arrangement of the first photoelectric conversion unit 111 and the second photoelectric conversion unit 121 to be out of alignment with each other by a half pitch in the second direction from the positions thereof along the first direction.

Since the first pixel 110 and the second pixel 120 are thus arranged, the position of the second photoelectric conversion unit 121 in the second direction becomes a position between two first photoelectric conversion units 111 adjacent in the second direction. In other words, the first photoelectric conversion unit 111 and the second photoelectric conversion unit 121 are arranged alternately at half-pitch intervals as seen along the second direction. Therefore, the resolution in the second direction can be improved compared with the photoelectric conversion device according to the first embodiment in which the first photoelectric conversion unit 111 and the second photoelectric conversion unit 121 are arranged at one pitch intervals.

Further, when pixels adjacent in the first direction are arranged out of alignment with each other by a half pitch in the second direction, and a charge holding unit is shared between these pixels, the capacitance value of this charge holding unit must be made large due to the layout of elements. However, in the photoelectric conversion device according to the present embodiment, since the first charge holding unit 114 and the second charge holding unit 124 are formed as independent charge holding units separately from the third charge holding unit, the capacitance values of these charge holding units can be made small, and hence the sensitivity can be improved.

Thus, according to the present embodiment, since the first pixel and the second pixel are arranged out of alignment by a half pitch in the second direction, the resolution in the second direction can be improved without reducing the sensitivity.

Third Embodiment

A photoelectric conversion device according to a third embodiment of the present invention will be described with reference to FIG. 4 and FIG. 5. The same reference numerals are given to the same constituent elements as those of the photoelectric conversion devices according to the first and second embodiments illustrated in FIG. 1 to FIG. 3 to omit or simplify the description.

Figure 4:
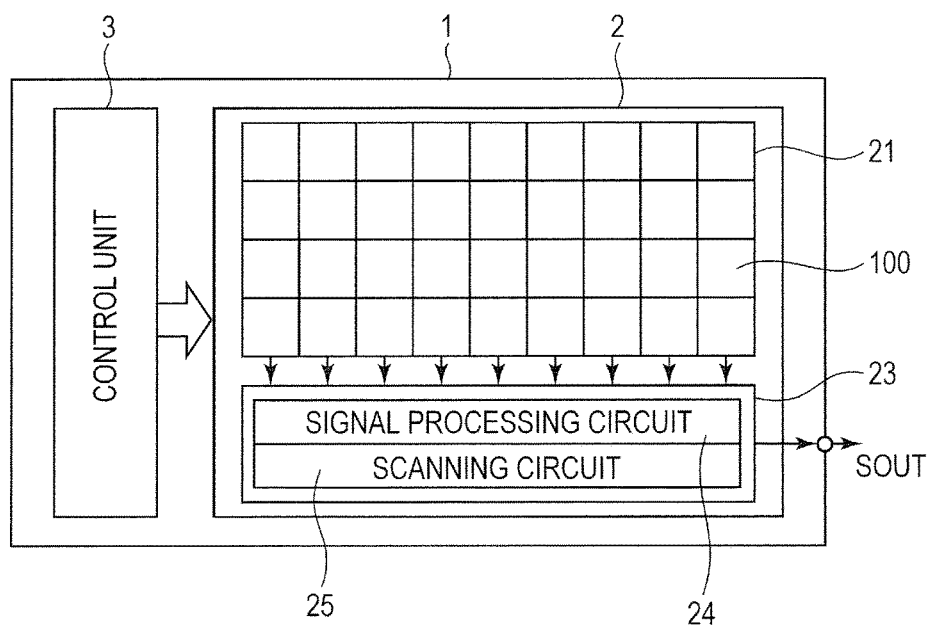
FIG. 4 is a block diagram illustrating a configuration example of a photoelectric conversion device according to a third embodiment of the present invention.

FIG. 4 is a block diagram of the photoelectric conversion device according to the present embodiment. FIG. 5 is a schematic view illustrating a configuration example of pixel units of the photoelectric conversion device according to the present embodiment.

First, the configuration of the photoelectric conversion device according to the present embodiment will be described with reference to FIG. 4 and FIG. 5.

As illustrated in FIG. 4, the photoelectric conversion device 1 according to the present embodiment has a sensor unit 2 and a control unit 3. The sensor unit 2 has a pixel unit 21, in which a plurality of unit pixel cells 100 are arranged in a two-dimensional array, and a signal processing unit 23. The signal processing unit 23 has a signal processing circuit 24 and a scanning circuit 25.

The pixel unit 21 is configured to transmit, to the signal processing unit 23, a pixel signal obtained by converting light incident on each pixel into an electric signal according to the amount of light. The signal processing circuit 24 is configured to perform predetermined signal processing on the pixel signal transmitted from the pixel unit 21 and hold the processed pixel signal as a sensor signal. As processing in the signal processing unit 23, there are correlated double sampling (CDS) processing, amplification processing, and the like. The scanning circuit 25 is configured to sequentially select a sensor signal based on a pixel signal held in the signal processing circuit 24 and output it as a sensor signal SOUT. The control unit 3 is configured to output a control signal for driving the sensor unit 2.

Figure 5:
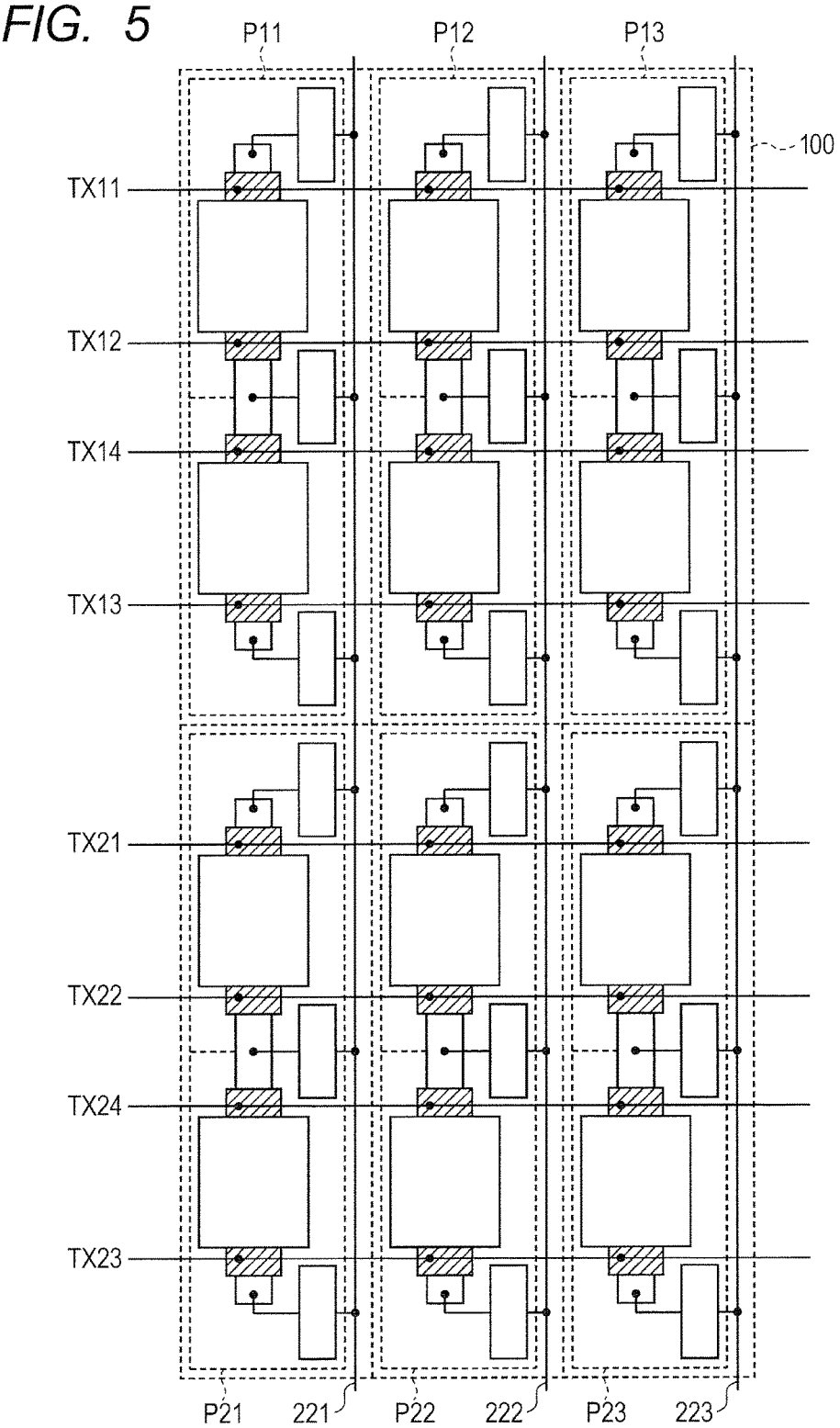
FIG. 5 is a schematic view illustrating a configuration example of a pixel unit of the photoelectric conversion device according to the third embodiment of the present invention.

FIG. 5 illustrates an example in which the pixel unit 21 is composed of unit pixel cells 100 of the photoelectric conversion device according to the first embodiment illustrated in FIG. 1. Here, an example in which the unit pixel cells 100 are arranged in a matrix with two rows and three columns is illustrated, but the number of rows and the number of columns of the matrix in which the unit pixel cells 100 are arranged are not limited thereto. In FIG. 5, a reference numeral corresponding to each row number and each column number is given to each unit pixel cell 100 for the purpose of illustration. For example, a pixel cell P12 represents a unit pixel cell 100 in the first row and the second column, and a pixel cell P23 represents a unit pixel cell 100 in the second row and the third column.

In the pixel unit 21, it is desired to arrange first photoelectric conversion units 111 and second photoelectric conversion units 121 in such a manner that their centers will be at equal intervals in the column direction (first direction) and the row direction (second direction), respectively.

In the pixel unit 21, a plurality of control lines TX11, TX12, TX13, TX14, TX21, TX22, TX23, and TX24 are arranged to extend in the row direction. Each of the control lines TX11, TX12, TX13, TX14, TX21, TX22, TX23, and TX24 is a signal line common to pixel cells lining up in the row direction, respectively. The control lines TX11 to TX14 and the control lines TX21 to TX24 are control lines for controlling transfer units, which correspond to the control lines TX1 to TX4 in FIG. 2, respectively. In other words, each of the control lines TX11, TX12, TX13, and TX14 is connected to each of the first transfer unit 112, the second transfer unit 113, the third transfer unit 122, and the fourth transfer unit 123 of each of pixel cells P11, P12, and P13, respectively. Each of the control lines TX21, TX22, TX23, and TX24 is connected to the first transfer unit 112, the second transfer unit 113, the third transfer unit 122, and the fourth transfer unit 123 of each of pixel cells P21, P22, and P23, respectively. The control lines TX11 to TX14 and TX21 to TX24 are connected to the control unit 3. A predetermined control signal is output from the control unit 3 to each of the control lines TX11 to TX14, and TX21 to TX24 at predetermined timing to transfer an accumulated signal charge to the photoelectric conversion unit of each pixel cell.

Further, in the pixel unit 21, a plurality of signal output lines 221, 222, and 223 are arranged to extend in the column direction. Each of the signal output lines 221, 222, and 223 is a signal line common to pixel cells lining up in the column direction, respectively. In other words, the signal output line 221 is connected to the first signal output unit 115, the second signal output unit 125, and the third signal output unit 127 of each of pixel cells P11 and P21, respectively. The signal output line 222 is connected to the first signal output unit 115, the second signal output unit 125, and the third signal output unit 127 of each of pixel cells P12 and P22, respectively. The signal output line 223 is connected to the first signal output unit 115, the second signal output unit 125, and the third signal output unit 127 of each of pixel cells P13 and P23, respectively.

Next, the operation of the photoelectric conversion device according to the present embodiment will be described with reference to FIG. 4 and FIG. 5. As driving methods for the photoelectric conversion device according to the present embodiment, there are two driving methods below.

In a first driving method, a control signal is output from the control unit 3 sequentially to each row of control lines connected to the first transfer units 112 and control lines connected to the third transfer units 122. For example, in the example of FIG. 5, the control signal is output sequentially to the control lines TX11, TX13, TX21, and TX23. Then, signal charges transferred to each row of the first charge holding units 114 and signal charges transferred to each row of the second charge holding units 124 are output as pixel signals sequentially to the signal output lines 221, 222, and 223 through the first signal output units 115 and the second signal output units 125. This enables pixel signals based on signal charges accumulated in each row of the first photoelectric conversion units 111 and pixel signals based on signal charges accumulated in each row of the second photoelectric conversion units 121 to be read out sequentially. As described in the first embodiment, highly sensitive imaging can be achieved by outputting pixel signals based on signal charges accumulated in the first photoelectric conversion units 111 and the second photoelectric conversion units 121 from the first signal output units 115 and the second signal output units 125.

In a second driving method, a control signal is output from the control unit 3 to each row of signal lines connected to the second transfer units 113 and each row of signal lines connected to the fourth transfer units 123 at the same time. For example, in the example of FIG. 5, the control signal is output to the control lines TX12 and TX14, and the control lines TX22 and TX24 sequentially. Then, signal charges transferred to each row of the third charge holding units 126 are output as pixel signals to the signal output lines 221, 222, and 223 through the third signal output units 127. This enables pixel signals based on signal charges accumulated in the first photoelectric conversion units 111 and pixel signals based on signal charges accumulated in the second photoelectric conversion units 121 are totaled, and read out sequentially row by row. The signal output range with respect to the amount of incident light can be expanded by outputting, from each of the third signal output units 127, the pixel signal based on the signal charges accumulated in the first photoelectric conversion unit 111 and the second photoelectric conversion unit 121.

Thus, in the photoelectric conversion device according to the present embodiment, unit pixel cells, each of which is provided with two transfer units for a photoelectric conversion unit, a charge holding unit connected to these transfer unit independently for each pixel, and a charge holding unit shared between the two pixels, are arranged in a two-dimensional array. This can improve the sensitivity and expand the dynamic range, and hence a high-quality image can be acquired even under a low light environment or high light environment.

Fourth Embodiment

A photoelectric conversion device and a focal position detecting device according to a fourth embodiment of the present invention will be described with reference to FIG. 6 and FIG. 7. The same reference numerals are given to the same constituent elements as those in the photoelectric conversion devices according to the first to third embodiments illustrated in FIG. 1 to FIG. 5 to omit or simplify the description.

Figure 6:
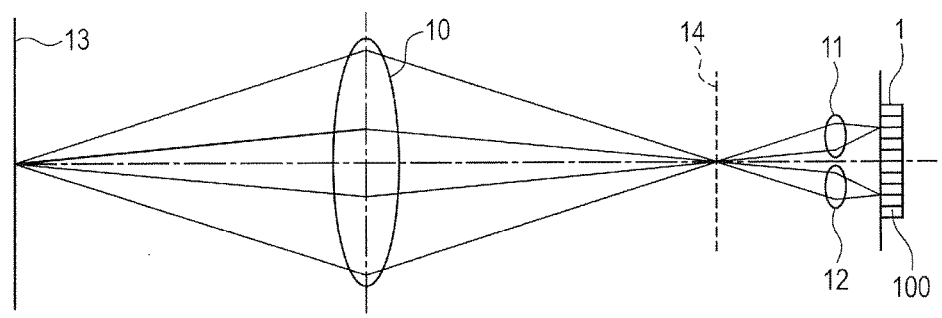
FIG. 6 is a schematic view illustrating a configuration example of a focal position detecting device according to a fourth embodiment of the present invention.

FIG. 6 is a schematic view illustrating a configuration example of a focal position detecting device according to the present embodiment. FIG. 7 is a plan view illustrating the configuration example the photoelectric conversion device according to the present embodiment.

In the present embodiment, an example in which the photoelectric conversion device according to the third embodiment is applied to the focal position detecting device.

As illustrated in FIG. 6, the focal position detecting device according to the present embodiment has a photoelectric conversion device 1, an imaging lens 10, and secondary image-forming lenses 11 and 12. For example, the photoelectric conversion device 1 is the photoelectric conversion device according to the third embodiment and has a plurality of unit pixel cells 100.

A subject image incident from a subject 13 through the imaging lens 10 is separated into two images by the two secondary image-forming lenses 11 and 12 to enter different regions of the photoelectric conversion device 1, respectively. This enables the photoelectric conversion device 1 to obtain two subject signals corresponding to two subject images, and hence to measure distance therebetween in order to measure how much the out of focus on the imaging face 14 is. Then, the imaging lens 10 can be moved based on the measured out-of-focus value to focus the subject image on the imaging face 14.

Figure 7:
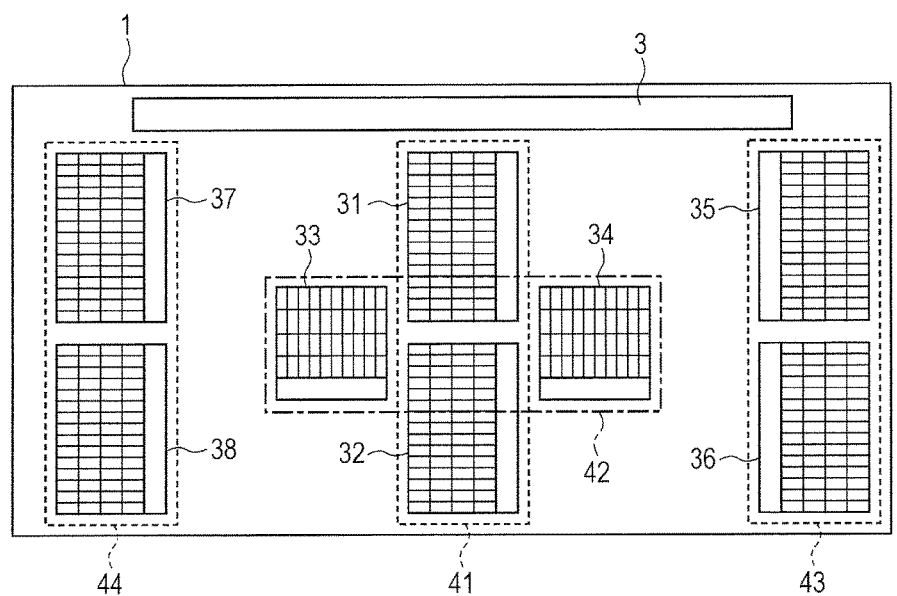
FIG. 7 is a plan view illustrating a configuration example of a photoelectric conversion device according to the fourth embodiment of the present invention.

FIG. 7 illustrates a specific configuration example of a photoelectric conversion device 1 applied to the focal position detecting device.

The photoelectric conversion device 1 has sensor units 31, 32, 33, 34, 35, 36, 37, 38, and a control unit 3. The configuration of each of the sensor units 31, 32, 33, 34, 35, 36, 37, and 38 is the same as the sensor unit 2 of the photoelectric conversion device according to the third embodiment illustrated in FIG. 4. For example, the sensor units 31, 32, 35, 36, 37, and 38 can be so arranged that the first direction will be parallel to the horizontal direction (the traverse direction in FIG. 7) and the second direction will be parallel to the vertical direction (the longitudinal direction in FIG. 7). Further, the sensor units 33 and 34 can be so arranged that the first direction will be parallel to the vertical direction and the second direction will be parallel to the horizontal direction.

The sensor unit 31 and the sensor unit 32 constitute a sensor pair 41, the sensor unit 33 and the sensor unit 34 constitute a sensor pair 42, the sensor unit 35 and the sensor unit 36 constitute a sensor pair 43, and the sensor unit 37 and the sensor unit 38 constitute a sensor pair 44. The sensor pairs are so arranged that subject images divided into two images by the secondary image-forming lenses 11 and 12 as illustrated in FIG. 6 are incident on each of the sensor pairs 41, 42, 43, and 44, respectively. Thus, distance information on the subject 13 can be acquired from each of the sensor pairs 41, 42, 43, and 44, respectively.

In the photoelectric conversion device 1 of the focal position detecting device according to the present embodiment, the sensor unit 2 of the photoelectric conversion device according to the third embodiment is applied to the sensor unit of an autofocus (AF) sensor. Thus, the improvement of sensitivity and the expansion of the dynamic range can be achieved. This can improve the focus detection accuracy under a low light environment and the focus detection accuracy under a high light environment.

Fifth Embodiment

An imaging system according to a fifth embodiment of the present invention will be described with reference to FIG. 8. The same reference numerals are given to the same constituent elements as those in the photoelectric conversion devices according to the first to fourth embodiments illustrated in FIG. 1 to FIG. 7 to omit or simplify the description.

Figure 8:
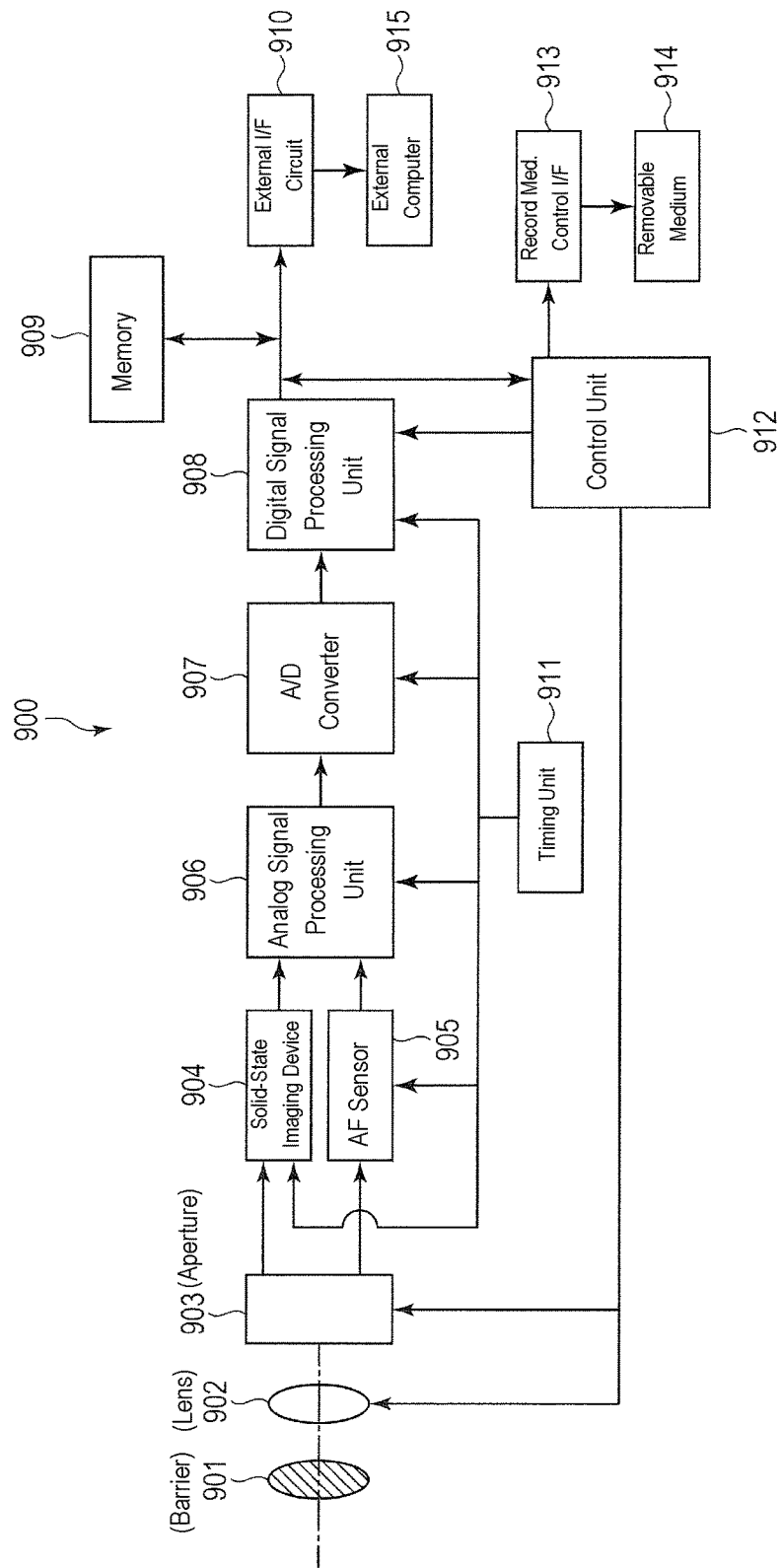
FIG. 8 is a block diagram illustrating a configuration of an imaging system according to a fifth embodiment of the present invention.

FIG. 8 is a block diagram illustrating a configuration example of the imaging system according to the present embodiment.

First, the configuration of the imaging system according to the present embodiment will be described with reference to FIG. 8.

As illustrated in FIG. 8, an imaging system 900 according to the present embodiment has a barrier 901, a lens 902, an aperture 903, a solid-state imaging device 904, and an AF sensor 905. The lens 902 is an optical system for forming an optical image of a subject. The barrier 901 protects the lens 902. The aperture 903 adjusts the amount of light passing through the lens 902. The solid-state imaging device 904 acquires, as an image signal, the optical image of the subject formed by the lens. The AF sensor 905 is the focal position detecting device using any of the photoelectric conversion devices described in the aforementioned embodiments.

The imaging system 900 further has an analog signal processing unit 906, an A/D converter 907, and a digital signal processing unit 908. The analog signal processing unit 906 processes a signal output from the solid-state imaging device 904 or the AF sensor 905. The A/D converter 907 performs analog-to-digital conversion on the signal output from the analog signal processing unit 906. The digital signal processing unit 908 performs various corrections on image data output from the A/D converter 907 or compression processing on the data.

Further, the imaging system 900 has a memory unit 909, an external I/F circuit 910, a timing generation unit 911, a general control/operation unit 912, and a recording medium control I/F unit 913. The memory unit 909 temporarily stores image data. The external I/F circuit 910 is used to communicate with an external device such as an external computer 915. The timing generation unit 911 outputs various timing signals to the digital signal processing unit 908 and the like. The general control/operation unit 912 performs various arithmetic operations and controls the entire camera. The recording medium control I/F unit 913 records acquired image data or exchanges data with a removable recording medium 914 such as a semiconductor memory for reading image data.

Next, operation at the time of taking a picture with the imaging system according to the present embodiment will be described with reference to FIG. 8.

When the barrier 901 is opened, an optical image from a subject is incident on the AF sensor 905 through the lens 902 and the aperture 903. Based on an output signal from the AF sensor 905, the general control/operation unit 912 calculates distance to the subject by the method of phase difference detection mentioned above. After that, the general control/operation unit 912 drives the lens 902 based on the calculation result, and determines again whether the image is in focus. When determining that the image is out of focus, the general control/operation unit 912 drives the lens 902 again to perform autofocus control.

Then, after the in-focus state is confirmed, charge accumulation by the solid-state imaging device 904 is started. When the charge accumulation by the solid-state imaging device 904 is completed, an image signal output from the solid-state imaging device 904 is subjected to predetermined processing in the analog signal processing unit 906, and then subjected to analog-to-digital conversion in the A/D converter 907. The image signal after being subjected to the analog-to-digital conversion is written into the memory unit 909 by the general control/operation unit 912 through the digital signal processing unit 908.

After that, data stored in the memory unit 909 are recorded on the recording medium 914 through the recording medium control I/F unit 913 under control of the general control/operation unit 912. Alternatively, the data stored in the memory unit 909 may be input directly to the external computer 915 through the external I/F circuit 910.

As described in the fourth embodiment, the AF sensor can be configured by using any of the photoelectric conversion devices illustrated in the aforementioned embodiments to improve the focus detection accuracy under a low light environment and the focus detection accuracy under a high light environment. Therefore, according to the imaging system according to the present embodiment using this AF sensor, focusing with a higher degree of precision can be performed, and hence a higher-resolution image can be acquired.

Modified Embodiments

The present invention is not limited to the aforementioned embodiments, and various modifications are possible.

For example, although the photoelectric conversion device using holes as signal charges is described in the above first embodiment, the present invention can also be applied to a photoelectric conversion device using electrons as signal charges.

Further, the circuit configuration of the unit pixel cell 100 of the photoelectric conversion device according to the first embodiment illustrated in FIG. 2 is a typical example of an applicable pixel circuit, and the circuit configuration of the unit pixel cell 100 applicable to the photoelectric conversion device of the present invention is not limited thereto.

Further, in the above third embodiment, the example in which the unit pixel cells 100 of the photoelectric conversion device according to the first embodiment are arranged in the two-dimensional array to constitute the pixel unit 21, but the unit pixel cells 100 that constitute the pixel unit 21 are not limited thereto. For example, the unit pixel cells 100 of the photoelectric conversion device according to the second embodiment may also be arranged in a two-dimensional array to constitute the pixel unit 21.

Further, in the above fourth embodiment, the focal position detecting device provided with four sensor pairs is illustrated, but the number of sensor pairs can be increased and decreased accordingly. The layout of sensor pairs is also not limited to that illustrated in FIG. 7.

Further, in the fifth embodiment, the example in which the AF sensor 905 is configured by the photoelectric conversion device of the present invention is illustrated, but the solid-state imaging device 904 may also be configured by the photoelectric conversion device of the present invention.

Further, the imaging system illustrated in the fifth embodiment is just one example of the imaging system to which the photoelectric conversion device of the present invention can be applied, and the imaging system to which the photoelectric conversion device of the present invention is applicable is not limited to the configuration illustrated in FIG. 8.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009241, filed on Jan. 21, 2015 which is hereby incorporated by reference herein in its entirety.

What is claimed is:

1. A photoelectric conversion device comprising:
a unit pixel cell having a plurality of photoelectric conversion units and a plurality of charge holding units; and
an output line connected to the unit pixel cell,
wherein the unit pixel cell includes:
a first photoelectric conversion unit and a second photoelectric conversion unit, each of which is part of the plurality of photoelectric conversion units;
a first charge holding unit, a second charge holding unit, and a third charge holding unit, each of which is part of the plurality of charge holding units;
a first transfer unit provided in an electric path between the first photoelectric conversion unit and the first charge holding unit;
a second transfer unit provided in an electric path between the first photoelectric conversion unit and the third charge holding unit;
a third transfer unit provided in an electric path between the second photoelectric conversion unit and the second charge holding unit;
a fourth transfer unit provided in an electric path between the second photoelectric conversion unit and the third charge holding unit;
a first signal output unit for outputting an electric signal according to a signal charge transferred to the first charge holding unit;
a second signal output unit for outputting an electric signal according to a second charge transferred to the second charge holding unit; and
a third signal output unit for outputting an electric signal according to a signal charge transferred to the third charge holding unit,
wherein the first signal output unit, the second signal output unit, and the third signal output unit are connected to the same output line, and
wherein a number of all photoelectric conversion units connected to the first charge holding unit, the second charge holding unit, and the third charge holding unit is smaller than three as a total number of the first charge holding unit, the second charge holding unit, and the third charge holding unit.

2. The photoelectric conversion device according to claim 1, wherein the second transfer unit and the fourth transfer unit are arranged to face each other across the third charge holding unit.

3. The photoelectric conversion device according to claim 1, wherein:
the first photoelectric conversion unit and the second photoelectric conversion unit have a shape of a rectangle,
the first transfer unit and the second transfer unit are arranged on opposite short sides of the rectangle of the first photoelectric conversion unit, respectively, and the third transfer unit and the fourth transfer unit are arranged on opposite short sides of the rectangle of the second photoelectric conversion unit, respectively.

4. The photoelectric conversion device according to claim 1, wherein the first photoelectric conversion unit and the second photoelectric conversion unit are arranged along a first direction.

5. The photoelectric conversion device according to claim 1, wherein:
the photoelectric conversion device includes a plurality of the unit pixel cells arranged in a two-dimensional array along a first direction and a second direction that intersects with the first direction, and
the first photoelectric conversion unit and the second photoelectric conversion unit are arranged out of alignment with each other by a half pitch in the second direction from positions thereof along the first direction.

6. The photoelectric conversion device according to claim 5, further comprising:
a plurality of first control lines, a plurality of second control lines, a plurality of third control lines, and a plurality of fourth control lines, each of which extends in the second direction; and
a processor configured to perform function of a control unit;
the control unit connected to the plurality of first control lines, the plurality of second control lines, the plurality of third control lines, and the plurality of fourth control lines,
wherein:
each of the plurality of first control lines is connected to the first transfer unit of each of the plurality of unit pixel cells arranged in the second direction,
each of the plurality of second control lines is connected to the second transfer unit of each of the plurality of unit pixel cells arranged in the second direction,
each of the plurality of third control lines is connected to the third transfer unit of each of the plurality of unit pixel cells arranged in the second direction,
each of the plurality of fourth control lines is connected to the fourth transfer unit of each of the plurality of unit pixel cells arranged in the second direction, and
the control unit is configured to drive the second transfer unit and the fourth transfer unit simultaneously.

7. The photoelectric conversion device according to claim 5, wherein the first photoelectric conversion unit and the second photoelectric conversion unit are so arranged that centers thereof are at equal intervals in the first direction and the second direction, respectively.

8. The photoelectric conversion device according to claim 5, wherein:
the photoelectric conversion device further includes a first sensor unit and a second sensor unit provided by arranging the plurality of unit pixel cells in a two-dimensional array along the first direction and the second direction,
the first photoelectric conversion unit and the second photoelectric conversion unit are arranged along the first direction in each of the unit pixel cells, and
the first sensor unit and the second sensor unit are arranged along the second direction.

9. An imaging system comprising:
a photoelectric conversion device including:
a unit pixel cell having a plurality of photoelectric conversion units and a plurality of charge holding units; and
an output line connected to the unit pixel cell,
wherein the unit pixel cell includes:
a first photoelectric conversion unit and a second photoelectric conversion unit, each of which is part of the plurality of photoelectric conversion units;
a first charge holding unit, a second charge holding unit, and a third charge holding unit, each of which is part of the plurality of charge holding units;
a first transfer unit provided in an electric path between the first photoelectric conversion unit and the first charge holding unit;
a second transfer unit provided in an electric path between the first photoelectric conversion unit and the third charge holding unit;
a third transfer unit provided in an electric path between the second photoelectric conversion unit and the second charge holding unit;
a fourth transfer unit provided in an electric path between the second photoelectric conversion unit and the third charge holding unit;
a first signal output unit for outputting an electric signal according to a signal charge transferred to the first charge holding unit;
a second signal output unit for outputting an electric signal according to a signal charge transferred to the second charge holding unit; and
a third signal output unit for outputting an electric signal according to a signal charge transferred to the third charge holding unit,
wherein the first signal output unit, the second signal output unit, and the third signal output unit are connected to the same output line,
wherein a number of all photoelectric conversion units connected to the first charge holding unit, the second charge holding unit, and the third charge holding unit is smaller than three as a total number of the first charge holding unit, the second charge holding unit and the third charge holding unit,
wherein the photoelectric conversion device includes a first sensor unit and a second sensor unit provided by arranging the plurality of unit pixel cells in a two-dimensional array along a first direction and a second direction that intersects with the first direction,
wherein the first photoelectric conversion unit and the second photoelectric conversion unit are arranged along the first direction in each of the unit pixel cells, and
wherein the first sensor unit and the second sensor unit are arranged along the second direction;
an optical lens system for forming an image from a subject in the first sensor unit and the second sensor unit of the photoelectric conversion device, respectively;
a processor configured to perform functions of an operation unit and a control unit;
the operation unit for calculating distance to the subject based on a signal output from the first sensor unit and a signal output from the second sensor unit; and
the control unit for controlling the optical lens system to focus on an imaging face based on the distance to the subject calculated by the operation unit.

10. A photoelectric conversion device comprising:
a unit pixel cell including:
a first photoelectric conversion unit;
a first transfer unit and a second transfer unit connected to the first photoelectric conversion unit;

a first charge holding unit connected to the first transfer unit and to which a signal charge generated in the first photoelectric conversion unit is transferred;
a second photoelectric conversion unit;
a third transfer unit and a fourth transfer unit connected to the second photoelectric conversion unit;
a second charge holding unit connected to the third transfer unit and to which a signal charge generated in the second photoelectric conversion unit is transferred;
a third charge holding unit connected to the second transfer unit and the fourth transfer unit, and to which a signal charge generated in the first photoelectric conversion unit and a signal charge generated in the second photoelectric conversion unit are transferred;
a first signal output unit for outputting an electric signal according to a signal charge transferred to the first charge holding unit;
a second signal output unit for outputting an electric signal according to a signal charge transferred to the second charge holding unit; and
a third signal output unit for outputting an electric signal according to a signal charge transferred to the third charge holding unit,
wherein the first signal output unit, the second signal output unit, and the third signal output unit are connected to the same output line, and
wherein a first capacitance value of the first charge holding unit and a second capacitance value of the second charge holding unit are smaller than a third capacitance value of the third charge holding unit.

11. The photoelectric conversion device according to claim 10, wherein the second transfer unit and the fourth transfer unit are arranged to face each other across the third charge holding unit.

12. The photoelectric conversion device according to claim 10, wherein:
the first photoelectric conversion unit and the second photoelectric conversion unit have a shape of a rectangle,
the first transfer unit and the second transfer unit are arranged on opposite short sides of the rectangle of the first photoelectric conversion unit, respectively, and
the third transfer unit and the fourth transfer unit are arranged on opposite short sides of the rectangle of the second photoelectric conversion unit, respectively.

13. The photoelectric conversion device according to claim 10, wherein the first photoelectric conversion unit and the second photoelectric conversion unit are arranged along a first direction.

14. The photoelectric conversion device according to claim 10, wherein:
the photoelectric conversion device includes a plurality of the unit pixel cells arranged in a two-dimensional array along a first direction and a second direction that intersects with the first direction, and
the first photoelectric conversion unit and the second photoelectric conversion unit are arranged out of alignment with each other by a half pitch in the second direction from positions thereof along the first direction.

15. The photoelectric conversion device according to claim 14, further comprising:
a plurality of first control lines, a plurality of second control lines, a plurality of third control lines, and a plurality of fourth control lines, each of which extends in the second direction; and
a processor configured to perform function of a control unit;
the control unit connected to the plurality of first control lines, the plurality of second control lines, the plurality of third control lines, and the plurality of fourth control lines,
wherein:
each of the plurality of first control lines is connected to the first transfer unit of each of the plurality of unit pixel cells arranged in the second direction,
each of the plurality of second control lines is connected to the second transfer unit of each of the plurality of unit pixel cells arranged in the second direction,
each of the plurality of third control lines is connected to the third transfer unit of each of the plurality of unit pixel cells arranged in the second direction,
each of the plurality of fourth control lines is connected to the fourth transfer unit of each of the plurality of unit pixel cells arranged in the second direction, and
the control unit is configured to drive the second transfer unit and the fourth transfer unit simultaneously.

16. The photoelectric conversion device according to claim 14, wherein the first photoelectric conversion unit and the second photoelectric conversion unit are so arranged that centers thereof will be at equal intervals in the first direction and the second direction, respectively.

17. The photoelectric conversion device according to claim 14, wherein:
the photoelectric conversion device further includes a first sensor unit and a second sensor unit provided by arranging the plurality of unit pixel cells in a two-dimensional array along the first direction and the second direction,
the first photoelectric conversion unit and the second photoelectric conversion unit are arranged along the first direction in each of the unit pixel cells, and
the first sensor unit and the second sensor unit are arranged along the second direction.

18. An imaging system comprising:
a photoelectric conversion device including:
a unit pixel cell including:
a first photoelectric conversion unit;
a first transfer unit and a second transfer unit connected to the first photoelectric conversion unit;
a first charge holding unit connected to the first transfer unit and to which a signal charge generated in the first photoelectric conversion unit is transferred;
a second photoelectric conversion unit;
a third transfer unit and a fourth transfer unit connected to the second photoelectric conversion unit;
a second charge holding unit connected to the third transfer unit and to which a signal charge generated in the second photoelectric conversion unit is transferred;
a third charge holding unit connected to the second transfer unit and the fourth transfer unit, and to which a signal charge generated in the first photoelectric conversion unit and a signal charge generated in the second photoelectric conversion unit are transferred;
a first signal output unit for outputting an electric signal according to a signal charge transferred to the first charge holding unit;

a second signal output unit for outputting an electric signal according to a signal charge transferred to the second charge holding unit; and a third signal output unit for outputting an electric signal according to a signal charge transferred to the third charge holding unit, wherein the first signal output unit, the second signal output unit, and the third signal output unit are connected to the same output line, and wherein a first capacitance of the first charge holding unit and a second capacitance of the second charge holding unit are smaller than a third capacitance of the third charge holding unit;

an optical lens system for forming an image from a subject in a first sensor unit and a second sensor unit of the photoelectric conversion device, respectively;

a processor configured to perform function of an operation unit and a control unit;

the operation unit for calculating distance to the subject based on a signal output from the first sensor unit and a signal output from the second sensor unit; and the control unit for controlling the optical lens system to focus on an imaging face based on the distance to the subject calculated by the operation unit.

\* \* \* \* \*